(No Model.)

W. D. CALDWELL & J. C. HENDRICKS.
HARROW.

No. 328,108. Patented Oct. 13, 1885.

Witnesses.
Harry J Daly
Robert E Mattingly

Inventors.
W. D. Caldwell
J. C. Hendricks
By Herring & Redmond, Attys.

N. PETERS. Photo-Lithographer, Washington, D. C.

United States Patent Office.

WILLIAM D. CALDWELL AND JOHN C. HENDRICKS, OF CRAWFORDSVILLE, ASSIGNORS OF ONE-HALF TO MOSES A. McCOID, OF FAIRFIELD, IOWA.

HARROW.

SPECIFICATION forming part of Letters Patent No. 328,108, dated October 13, 1885.

Application filed March 28, 1885. Serial No. 160,465. (No model.)

*To all whom it may concern:*

Be it known that we, WILLIAM D. CALDWELL and JOHN C. HENDRICKS, citizens of the United States, residing at Crawfordsville, in the county of Washington and State of Iowa, have invented certain new and useful Improvements in Harrows; and we do hereby declare the following to be a full, clear, and exact description of the invention, such as will enable others skilled in the art to which it appertains to make and use the same.

Our invention relates to that class of harrows in which the teeth are loosely held in the frame so that they may revolve or turn in their bearings and free themselves of earth, grass, or sticks; and it consists in the construction and combinations of parts, as hereinafter fully described and claimed.

Figure 1:
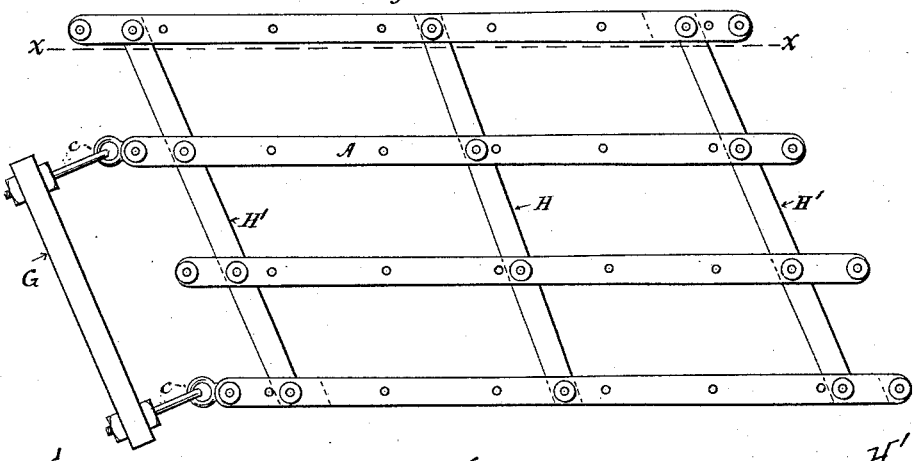
Figure 2:
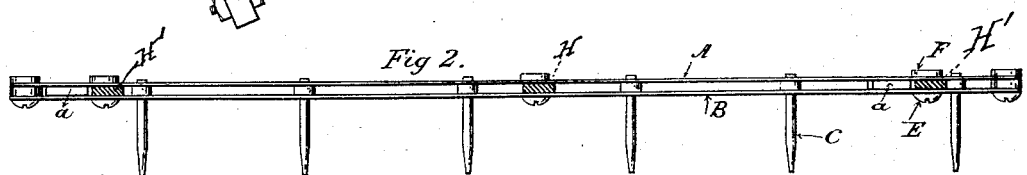
Figure 4:
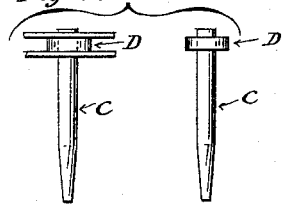
Figure 5:
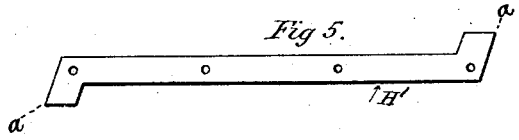
Figure 3:
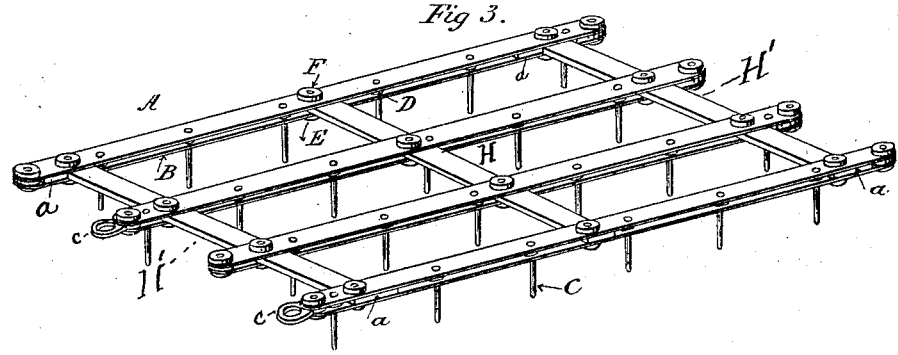

In the accompanying drawings, forming a part of this specification, Figure 1 is a plan view of our improved harrow; Fig. 2, a vertical section on the line x x, Fig. 1; Fig. 3, a perspective view, and Figs. 4 and 5 detail views.

Similar letters refer to similar parts throughout the several views.

The frame of our improved harrow is rhomboidal in shape, and consists of the double bars A B, usually four in number, and the center bar, H, and end bars, H'. The bars A B are placed one above the other, and are of equal length and breadth throughout. The bars H and H' extend across the frame from side to side, and between the bars A B, being securely held in place by screw-bolts E, which pass through openings in all the bars at their points of contact and into nuts F. The end bars, H', have short lateral extensions a at their extremities, which project in opposite directions, and which are parallel to the bars A B when the bars H' are in position. These extensions support the bars A B, keep them apart, and prevent them from sagging, and thus permit of the collars D and teeth C turning.

The teeth C are cast with the collars D thereon, preferably; but they may be cast separately and rigidly secured thereon. These collars answer three purposes: first, they prevent the teeth working loose or wabbling; second, they hold the teeth securely in place against loss, and, third, they assist in keeping the bars A B properly spaced apart. The teeth are arranged in the bars so that they are in alignment or are set on the square; but when the harrow is in use they break joint, and thus prevent it gathering grass, sticks, &c.

In constructing the harrow we first arrange the teeth in the bars B, and then lay the bars H H' at equal distances apart and place the bars A on top, and secure the whole by the screw-bolts E and nuts F.

G represents the usual whiffletree, attached by means of lugs c to the first and third bars.

In the drawings we show but one section of the harrow, but in practice we use two or more.

Having thus described our invention, what we claim as new, and desire to secure by Letters Patent, is—

1. In a harrow, the combination of the flat bars A B, one above the other, and the cross-bars H H', secured between said bars A B, with the revoluble teeth C, substantially as described.

2. A harrow-tooth having a collar between its head and point, substantially as described.

3. The combination, in a harrow, of the bars A B, the bar H, and the bars H', the latter having the lateral and oppositely-projecting extensions a, substantially as described.

4. The combination, in a harrow, of the bars A B and cross-bars H H', and means for securing them together, with the teeth C, having collars D, substantially as described.

5. A harrow comprising a rhomboidal frame, consisting of the double bars A B, the center bar, H, end bars, H', having the lateral extensions a, the teeth C, and collars D, substantially as described.

In testimony whereof we affix our signatures in presence of two witnesses.

WILLIAM D. CALDWELL.
JOHN C. HENDRICKS.

Witnesses:
JUDSON HIGLEY,
GEORGE BURK.